July 19, 1932.  J. J. NEVILLS  1,868,022
COOKER
Filed Jan. 23, 1931  4 Sheets-Sheet 1

FIG_3_

Patented July 19, 1932

1,868,022

UNITED STATES PATENT OFFICE

JOHN J. NEVILLS, OF OAKLAND, CALIFORNIA, ASSIGNOR TO LIBBY, McNEILL & LIBBY, OF SAN FRANCISCO, CALIFORNIA, A CORPORATION OF MAINE

COOKER

Application filed January 23, 1931. Serial No. 510,628.

My invention relates in general to cookers and more particularly to cookers suitable for use in canneries for cooking the contents of sealed cans.

It has been customary in canneries to employ cookers for cooking canned goods in which some provision was made for causing the sealed cans to be conveyed through the cooker at a predetermined rate. From the time the cans enter the cooker to the time they leave the same, they are subjected to the heating medium within the cooker and by controlling the time the cans remain in the cooker, the desired degree of cooking can be attained for any one of the various edibles which are to be canned.

Heretofore, however, cookers of the above described character have been complicated in structure and have been inefficiently designed with the result that they occupied a great deal more space than was justified by the amount of production. Cookers heretofore employed have also been objectionable for the reason that the conveying means was inefficient and required more motive power to do the work than should have been required.

It is a general object of this invention to provide a cooker of the class described which is more efficient and more reliable than cookers heretofore employed.

It is a further object to provide a cooker which requires less motive power and which occupies less factory space for the same amount of production.

It is a further object to provide a cooker in which the time of cook can be controlled more accurately, thereby resulting in a more uniform product.

These and other objects and advantages are attained in the embodiment of my invention illustrated in the accompanying drawings, in which.

Figure 1:
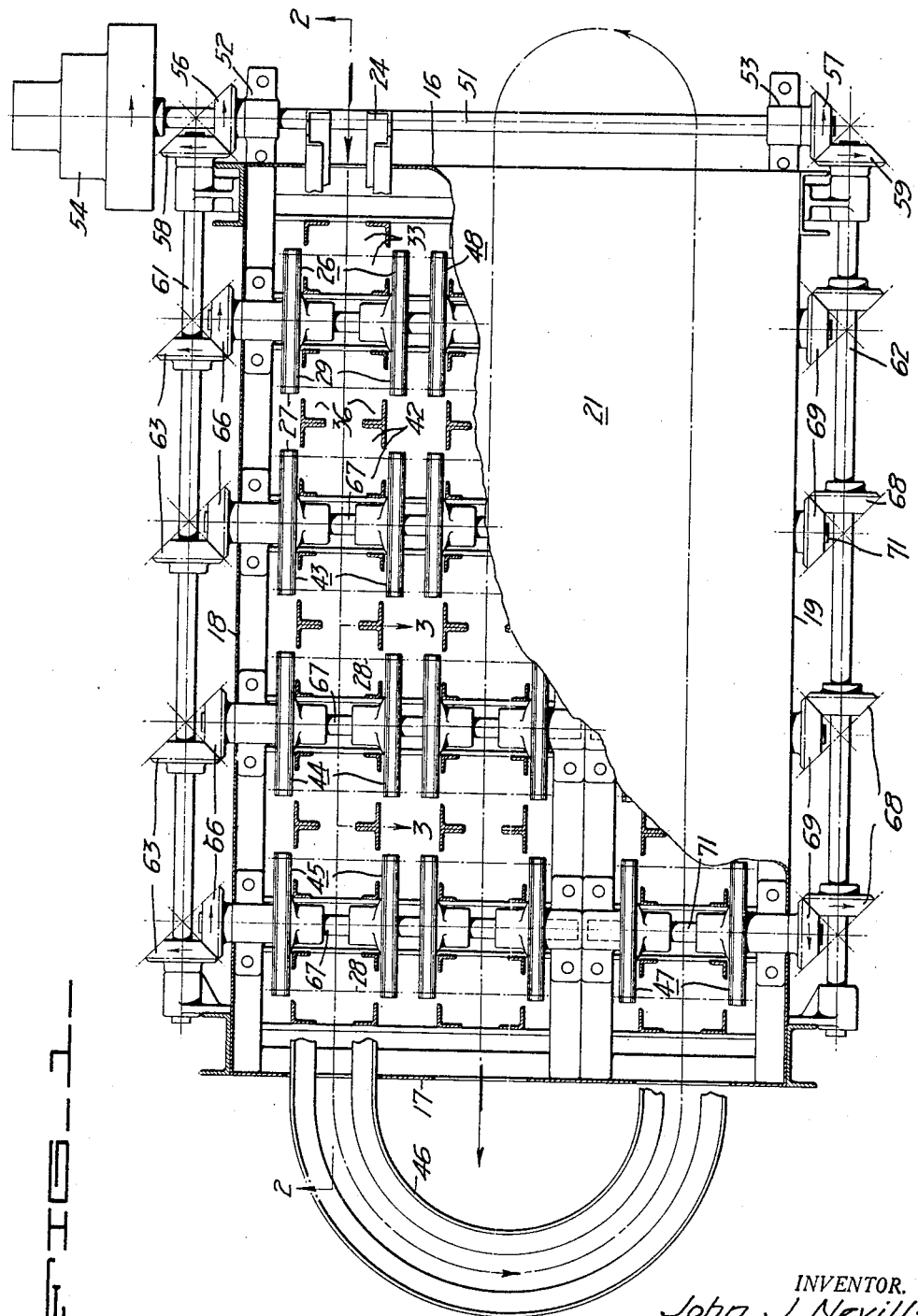
Fig. 1 is a top view of a cooker embodying the principles of the invention, with part of the top wall broken away to show the internal construction.

In its preferred form the cooker of my invention comprises a cooking chamber having a medium therein which is suitably heated and conveying means for delivering sealed cans into and out of the chamber at a predetermined rate. Preferably, the path taken by the cans in their travel through the cooking chamber is sinuous in outline, thereby utilizing the space within the cooking chamber to the fullest advantage.

Referring now to the drawings, I have shown a cooking chamber having end walls 16 and 17, side walls 18 and 19, a top wall 21 and a bottom wall 22. The chamber is adapted to contain a suitable heating medium, such as steam, or hot water 73 having a temperature which is sufficiently high to effect the cooking of the contents of the sealed cans as they are passed through the chamber at a certain rate.

Figure 4:
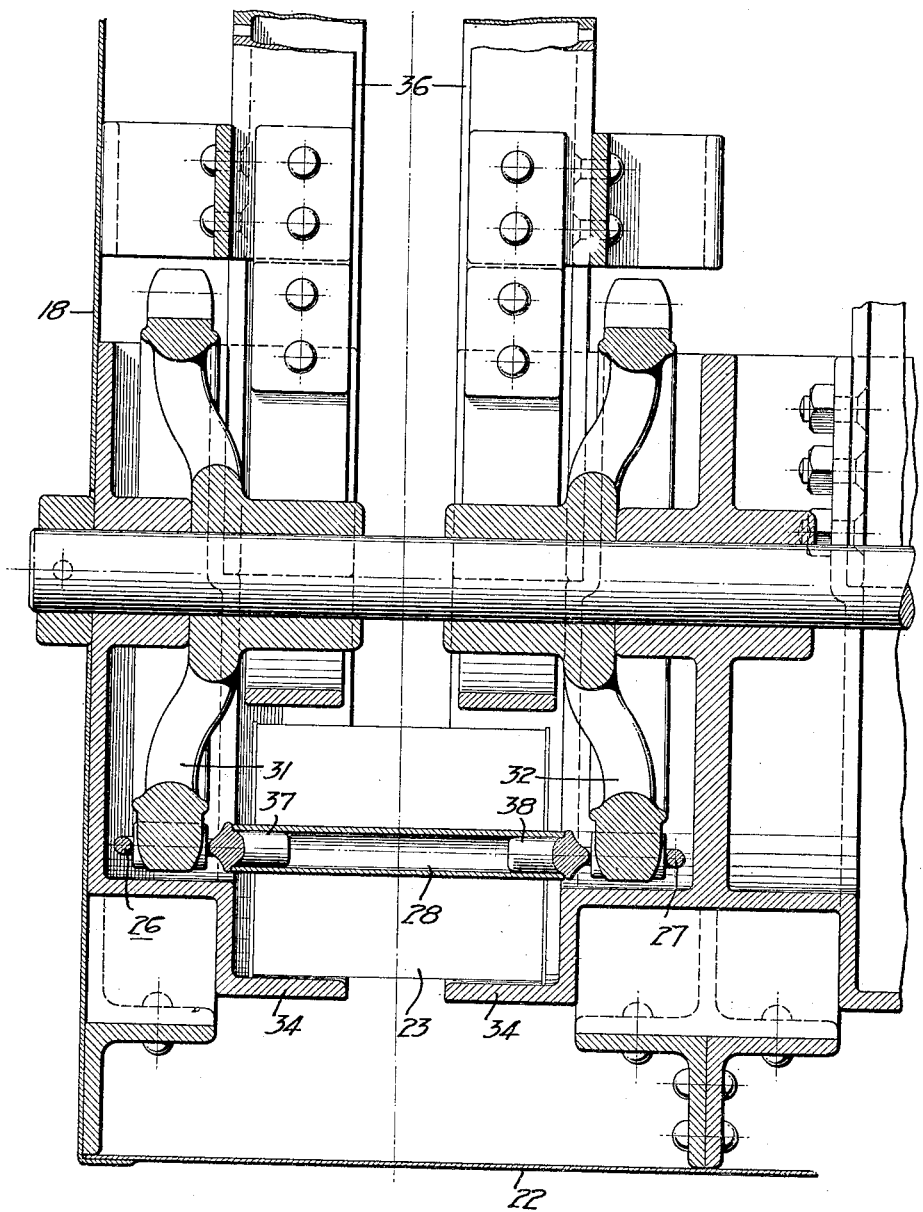
Fig. 4 is a cross sectional view taken along the line 4—4 of Fig. 3.

For delivering a series of sealed cans into the cooking chamber an inclined runway 24 is provided which pierces the end wall 16 of the chamber. The cans 23 roll gravitally down the runway 24 and are guided into the path of an endless conveyor 26. The conveyor 26 has a general oval contour and comprises a pair of side chains 27, each lying in a plane which is parallel to the plane of the other, and a plurality of cross bars 28 extending between the two chains and disposed at spaced intervals along the same. The chains 27 of the conveyor 26 pass around a pair of driving sprockets 29 at the upper extremity of the conveyor and a pair of idler sprockets 31 and 32 (shown in detail in Fig. 4) are provided at the lower extremity of the conveyor with which the chains mesh.

Figure 2:
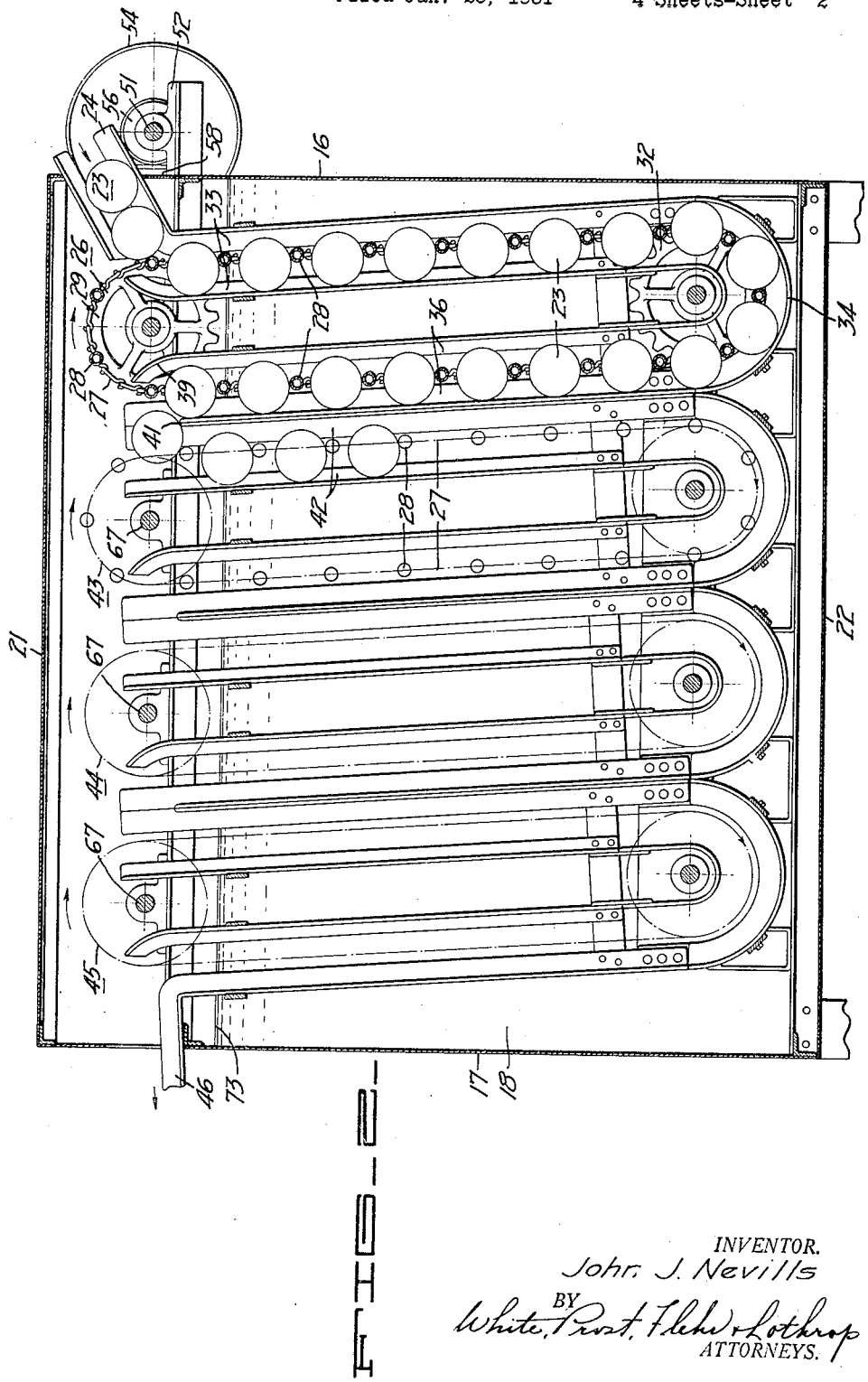
Fig. 2 is an elevational cross-section taken along the line 2—2 of Fig. 1.
Figure 3:
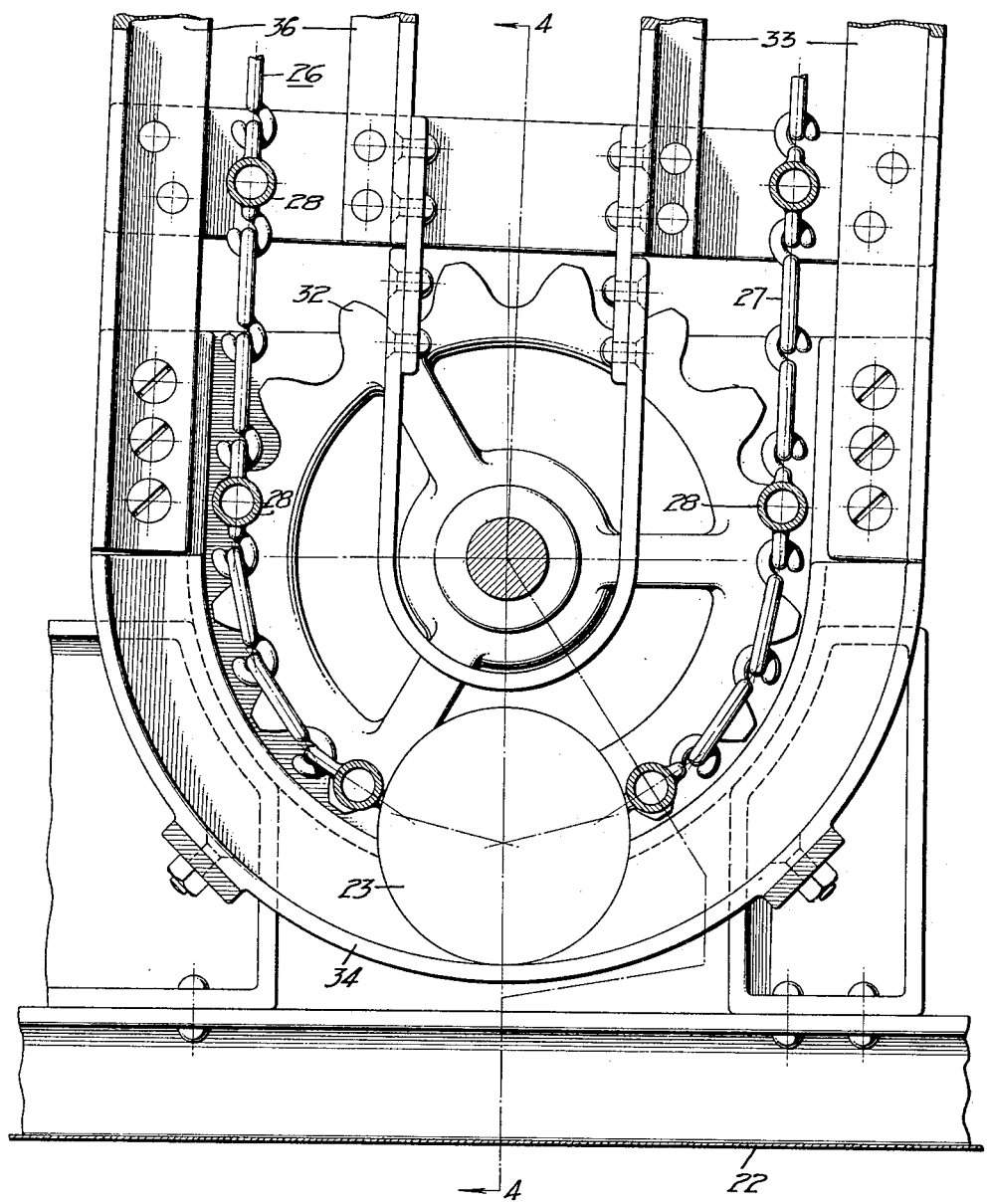
Fig. 3 is a detail view on an enlarged scale showing certain details of construction of the guides and chains.

When the driving sprockets 29 are rotated in the direction of the arrow shown in Fig. 2, the cross bars 28 move downwardly within a guideway 33 and as each of the cross bars passes the discharge end of the runway 24, at least one of the cans 23 is permitted to fall into the guideway 33, and thereafter the cans rest upon the cross bars 28 during their descent in the guideway 33. At the lower end of guideway 33 a curved portion 34 is provided which directs the cans into an upwardly extending guideway 36. The guideways 33, 34 and 36 follow the contour of conveyor 26 and the bars 28 on the conveyor pass upwardly within the guideway 36, thereby conveying the cans 23 once more to the upper portion of the cooking chamber. Preferably, the chains 27 of the conveyor rung along the outside of the guideways 33 and 36 and only the cross bars 28 extend within the guideways. One construction for accomplishing this object is shown in detail in Fig. 4, in which the sprockets 31 and 32 about which the chains 27 pass, are disposed on either side of the guideways. By this construction only the cross bars 28 of the conveyor 26 come in contact with the cans and there is thus no possibility of any of the cans interfering with the movement of the chains 27.

While the guideways 33 and 36 extend approximately vertically within the cooking chamber, it is desirable that they be tilted slightly from a true vertical direction so that all of the cans 23 will tend to fall on the same side of the cross bars 28 of the conveyor and rest against the same side of the guideways. In order to overcome the friction between the walls of the guideways and the cans, each can is permitted to rotate about its own longitudinal axis as it travels along and to facilitate this rotational movement each of the cross bars 28 can be mounted loosely on members 37 and 38 carried by the chains 27, if desired, so that the cross bars are also capable of rotation.

When the cans 23 reach the upper end of the guideway 36, a curved guide member 39 deflects the cans from the oval path taken by the conveyor chain and the cans are caused to topple over the edge 41 of a partition into a downwardly extending guideway 42 similar to the guideway 33. A conveyor 43, which can be similar in all respects with the conveyor 26 heretofore described, causes the cans to travel first down and then up until they are caused to topple over into the path of still another endless conveyor 44 and into the paths of as many other conveyors 45 as may be desired. Thus, the cans are caused to trace a sinuous path lying in a substantially vertical plane as they travel from one end of the cooking chamber to the other. Since the weight of the cans moving downwardly in guideway 33 substantially counter-balances the weight of the cans passing upwardly in guideway 36, the force required to move the cans is kept at a minimum and is determined largely by the unavoidable friction losses of the system. By enabling the cans to rotate as described instead of compelling them to slide along the guideways, friction losses are reduced, thereby resulting in a further saving in power. The rotational movement of the cans does not only reduce friction, but in addition such movement results in more uniform cooking of the contents of the cans.

After the cans leave the last conveyor 45 they are directed into a runway 46 which is inclined slightly downward as shown in Fig. 2 and which is adapted to carry the cans in the general direction shown by the dot and dash lines in Fig. 1 and from the runway 46 the cans pass into another series of conveyors 47 similar to the series of conveyors already described. The conveyors 47 cause the cans to travel in a sinuous path which lies in a plane which is parallel to the plane of the sinuous path first taken by the cans. After leaving the conveyors 47 the cans pass outwardly through the wall 16 of the chamber and if desired they can be passed through still another series of conveyors 48 and so on, the cans being carried through the cooking chamber in as many sinuous paths as may be desired.

Preferably, the runway 46 carries the cans outside of the cooking chamber so that they are accessible for removal before entering the next series of conveyors. However, it is not essential that the cans actually be passed outside the cooking chamber in order to make them accessible for removal and if desired, the runway 46 can be disposed within the chamber and any suitable means provided for removing the cans from the runway as they pass from one series of conveyors to the next. This feature is desirable since the contents of certain cans are adapted to be completely cooked after they have completed less than the entire number of runs through the cooking chamber. Thus, in the embodiment of my invention shown, the cans can be removed after they have completed either one, two or three runs and likewise, cans can be started through the cooker at the beginning of either the second or the third run, if desired, so that all cans will be discharged from the cooker at the same point. By the exercise of this feature the time of cook can be varied without changing the speed of the conveyors.

For driving all of the conveyors simultaneously, I have shown a drive shaft 51 journalled in bearings 52 and 53 and having secured thereto a stepped pulley 54 or its equivalent whereby the shaft 51 can be driven at different speeds. The shaft 51 has fixed thereon a pair of bevel gears 56 and 57 meshing with gears 58 and 59, keyed or otherwise secured to shafts 61 and 62 respectfully. Shaft 61 has secured thereto a plurality of bevel gears 63 meshing with gears 66 for imparting rotational movement to the shafts 67 which carry the drive sprockets 29 of the first and third series of conveyors, as viewed in Fig. 1. In a similar manner gears 68 secured to shafts 62 mesh with gears 69 on shafts 71 for rotating shafts 71 which carry the driving sprockets 29 of the second series of conveyors. As illustrated in Fig. 1, shafts 67 and shafts 71 are preferably separate and capable of independent rotation and by the arrangement of gearing described above shafts 67 and shafts 71 are adapted to rotate in opposite directions.

By this arrangement, the cans 23 are at the proper level after they have finished a run through one series of conveyors to begin their journey through the next series of conveyors and it is unnecessary to raise or lower the cans between successive runs, except that the guideways between successive runs can be inclined slightly so that the cans will pass gravitally from one series of conveyors to the next. Thus, when the path taken through the cooker is that indicated by the dot and dash line of Fig. 1 and in the direction of the arrows, the cans will be elevated at the end of the first run, as viewed in Fig. 2, and will be in readiness to descend on the first movement through the second run, the conveyors of which are moving in a direction which is opposite to that of the conveyors of the first run. Likewise, at the end of the second run, the cans are again in elevated position and can descend on the first movement through the third run, which is the one illustrated as being in the center in Fig. 1. It is to be understood that any number of successive runs can be provided, merely by extending the apparatus and that irrespective of the number of runs, all of the conveyor sprockets can be mounted on two series of shafts, corresponding to shafts 67 and 71, the shafts of one series rotating in a direction opposite to that of the second series.

In the operation of the cooker, the chamber is filled or partly filled with a heating medium, preferably hot water at or close to the boiling point. The sealed cans, the contents of which are to be cooked, are placed on the inclined runway 24 so that they tend to roll toward the conveyor 26 and as the conveyor chain is being driven by sprockets 29, in the direction of the arrow, one or more cans roll into the guideway 33 each time one of the cross bars 28 passes the runway 24. In the embodiment shown only one can enters the guideway 33 upon the passage of each cross bar 28, but it will be understood that if the distance between successive cross bars is increased relative to the size of the cans, more than one can will be admitted.

Due to the inclination of the guideway 33 all of the cans will rest against the left hand side of the guideway, as viewed in Fig. 2, and as the cans are carried along by the conveyor they are immersed in the hot water 73 and pass relatively slowly around the curved portion 34 of the guideway and then upward along the guideway 36. Near the upper end of guideway 36 the cans are removed from the water, if the water level is below the edge 41 of the partition between the conveyors as shown, and shortly thereafter the cans topple over the edge of the partition and begin their descent in the next conveyor. Thus, the cans are alternately immersed in the water and withdrawn therefrom as they travel from one end of the cooker to the other. It is to be understood, however, that the edge of the partition and the guideway can be disposed entirely below the surface of the water, so that the cans will remain immersed during their entire passage through the cooker, or, if desired, so that they are withdrawn only between successive runs or at any other predetermined interval.

Assuming that the speed at which the conveyors are driven is such that one hour elapses while the cans pass through a single run, the cans will begin to emerge from the cooker and roll along the runway 46 at the end of one hour. If the contents of the cans have been cooked sufficiently at the end of this time, the cans can be removed while they are on the runway 46. If a further cook of one hour is desired, the cans are permitted to roll into the second series of conveyors and can be removed at the end of the second run, and so on, the cans being permitted to complete any number of runs up to the maximum number, as limited by the extent of the cooker.

It will be understood that a suitable motor is provided for rotating pulley 54, preferably an electric motor having a complementary stepped pulley which can be connected to pulley 54 by a belt or the equivalent. By shifting the belt to another position on the pulley and by maintaining the speed of the motor substantially constant, the conveyors can be driven at a different rate. If desired, suitable means can also be provided for varying the speed of the motor, thereby enabling close adjustment of the rate at which the conveyors are driven. Thus, the conveyors can be driven at any desired speed which speed will ordinarily be determined by the contents of the cans.

While I have shown and described a preferred embodiment of my invention, I do not wish to be limited thereto, since the invention as defined in the appended claims can be embodied in a plurality of other forms.

I claim:

1. In a cooker of the class described, a plurality of endless conveyors each following an oval path, the paths of said conveyors lying in the same vertical plane with the longitudinal axis of each oval path inclined from the true vertical, each of said conveyors serving to convey cans delivered to the cooker first downwardly and then upwardly, a guide member associated with each conveyor for retaining the cans upon the conveyor during their upward travel, each of said guide members terminating at its upper end at a point which is below the upper extremity of the oval path followed by its associated conveyor, the inclination from the vertical of the upward travel of the cans being in such a direction that the cans fall away from the conveyor when the upper end of the guide member is reached and are caused to topple gravitationally over the end of the guide member into the downwardly moving side of the succeeding endless conveyor.

2. In a cooker of the class described, a plurality of endless conveyors each following an oval path, the paths of said conveyors lying in the same vertical plane, each of said conveyors serving to convey cans delivered to the cooker first downwardly and then upwardly, a guide member associated with each conveyor for retaining the cans upon the conveyor during their upward travel, each of said guide members terminating at its upper end at a point which is below the upper extremity of the oval path followed by its associated conveyor, and deflecting means near the upper end of the oval path followed by each conveyor for positively deflecting the cans away from the associated conveyor before they begin to travel over the top thereof, said deflecting means serving to deflect the cans over the top of said guide member and into the downwardly moving side of the succeeding conveyor.

3. In a cooker of the class described, a plurality of endless conveyors each following an oval path, the paths of said conveyors lying in the same vertical plane with the longitudinal axis of each oval path inclined from the true vertical, each of said conveyors serving to convey cans delivered to the cooker first downwardly and then upwardly, a guide member associated with each conveyor for retaining the cans upon the conveyor during their upward travel, each of said guide members terminating at its upper end at a point which is below the upper extremity of the oval path followed by its associated conveyor, the inclination from the vertical of the upward travel of the cans being in such a direction that the cans fall away from the conveyor when the upper end of the guide member is reached and are caused to topple gravitationally over the end of the guide member into the downwardly moving side of the succeeding endless conveyor, and deflecting means near the upper end of the oval path followed by each conveyor for positively deflecting the cans away from the associated conveyor before they begin to travel over the top thereof.

4. In a cooker of the class described, a cooking chamber, a series of endless conveyors disposed within said chamber, each of said conveyors following an oval path having its longitudinal axis substantially vertical but slightly inclined therefrom, each of said conveyors serving to convey cans delivered to the cooker first downwardly and then upwardly, means for causing the cans to leave each conveyor at the end of their upward travel and to enter a succeeding conveyor, a runway communicating with the point of discharge of the last conveyor of the series, said runway extending outside of the cooking chamber and entering the same at another point, a second series of similar conveyors disposed within said chamber, said runway serving to direct the cans into said second series of conveyors, said cans being accessible for removal while they are on the runway.

5. In a cooker of the class described, a cooking chamber, a series of endless conveyors disposed within said chamber, each of said conveyors following an oval path having its longitudinal axis substantially vertical but slightly inclined therefrom, each of said conveyors serving to convey cans delivered to the cooker first downwardly and then upwardly, means for causing the cans to leave each conveyor at the end of their upward travel and to enter a succeeding conveyor, a runway communicating with the point of discharge of the last conveyor of the series, said runway extending outside of the cooking chamber and entering the same at another point, a second series of similar conveyors disposed within said chamber, said runway serving to direct the cans into said second series of conveyors, said cans being accessible for removal while they are on the runway, and said runway being inclined downwardly from the end of the first series of conveyors to the beginning of the second series of conveyors, whereby the cans which are not removed roll gravitationally from one series of conveyors to the next.

6. In a cooker of the class described, a cooking chamber, a series of endless conveyors disposed within said chamber, each of said conveyors following an oval path having its longitudinal axis substantially vertical but slightly inclined therefrom, each of said conveyors serving to convey cans delivered to the cooker first downwardly and then upwardly, a guide member associated with each conveyor for retaining the cans upon the conveyor during their upward travel, each of said guide members terminating at its upper end at a point which is below the upper extremity of the oval path followed by its associated conveyor, the inclination from the vertical of the upward travel of the cans being in such a direction that the cans fall away from the conveyor when the upper end of the guide member is reached and are caused to topple gravitationally over the ends of the guide member into the downwardly moving side of the succeeding endless conveyor, deflecting means near the upper end of the oval path followed by each conveyor for positively deflecting the cans away from the associated conveyor before they begin to travel over the top thereof, a runway communicating with the point of discharge of the last conveyor of the series, said runway extending outside of the cooking chamber and entering the same at another point, a second series of similar conveyors disposed within said chamber, said runway serving to direct the cans into said second series of conveyors, said cans being accessible for removal while they are on the runway, and said runway being inclined downwardly from the end of the first series of conveyors to the beginning of the second series of conveyors, whereby the cans which are not removed roll gravitationally from one series of conveyors to the next.

In testimony whereof, I have hereunto set my hand.

JOHN J. NEVILLS.